United States Patent
Piehler et al.

(10) Patent No.: US 9,026,652 B1
(45) Date of Patent: May 5, 2015

(54) WEB SERVICE ASSET MANAGEMENT AND WEB SERVICE INFORMATION STORAGE

(71) Applicant: FMR LLC, Boston, MA (US)

(72) Inventors: Todd Piehler, Webster, MA (US); Rick Moran, Rehoboth, MA (US); Caren Noonan, North Grafton, MA (US); Bill LaPrade, Hopedale, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/327,470

(22) Filed: Jul. 9, 2014

(51) Int. Cl.
| | | |
|---|---|---|
| *G06F 15/173* | (2006.01) | |
| *H04L 12/24* | (2006.01) | |
| *G06F 17/30* | (2006.01) | |
| *G06Q 10/06* | (2012.01) | |
| *G06F 9/44* | (2006.01) | |

(52) U.S. Cl.
CPC ...... *H04L 41/0226* (2013.01); *G06F 17/30893* (2013.01); *G06Q 10/06* (2013.01); *G06F 17/30914* (2013.01); *G06F 8/10* (2013.01); *G06F 17/3089* (2013.01)

(58) Field of Classification Search
CPC .......... G06G 17/30914; G06G 17/30893; G06G 17/3089; G06G 17/30911; G06Q 10/06; G06Q 10/10; G06Q 10/101; H04L 63/10; H04L 67/16; H04L 67/28; G06F 8/10; G06F 17/3089
USPC ......................................... 709/203, 217, 224
See application file for complete search history.

(56) References Cited

U.S. PATENT DOCUMENTS

| | | |
|---|---|---|
| 7,188,114 B2 | 3/2007 | Liu |
| 7,222,121 B2 | 5/2007 | Casati |
| 7,428,582 B2 | 9/2008 | Bean |
| 7,596,583 B2 | 9/2009 | Chang |
| 7,694,140 B1 | 4/2010 | Savchenko |
| 7,698,569 B2 | 4/2010 | Beiter |
| 7,797,400 B2 | 9/2010 | Singh |
| 7,912,938 B2 | 3/2011 | Sayal |
| 7,962,470 B2 | 6/2011 | Degenkolb |
| 7,962,497 B2 | 6/2011 | Albahari |
| 7,987,163 B2 | 7/2011 | Keshavarz-Nia |
| 8,006,140 B2 | 8/2011 | Khanna |
| 8,010,695 B2 | 8/2011 | Savchenko |
| 8,069,435 B1 | 11/2011 | Lai |
| 8,132,180 B2 | 3/2012 | Agarwal |
| 8,140,987 B2 | 3/2012 | Keren |
| 8,166,006 B2 | 4/2012 | Brown |
| 8,180,849 B2 | 5/2012 | Viegener |
| 8,271,446 B2 | 9/2012 | Tailliez |
| 8,438,074 B2 * | 5/2013 | Serbanescu .................. 705/26.4 |

(Continued)

FOREIGN PATENT DOCUMENTS

EP     1862922     12/2007

OTHER PUBLICATIONS

Lin et al., "Discovery of Semantic Relations between Web Services," LSDIS (Large Scale Distributed Information Systems) Lab Department of Computer Science, University of Georgia, 8 pages.

*Primary Examiner* — Thu Ha Nguyen
(74) *Attorney, Agent, or Firm* — Proskauer Rose LLP (57) ABSTRACT

Described herein are methods and systems for management of web services, including relationship mapping, searching, data mapping, importing web service information to and exporting web service information from a web services repository, and discovering web services at run-time.

22 Claims, 5 Drawing Sheets

(56) References Cited

U.S. PATENT DOCUMENTS

| | | | |
|---|---|---|---|
| 8,700,682 B2* | 4/2014 | Tedder et al. | 707/809 |
| 2005/0080661 A1 | 4/2005 | Casati | |
| 2005/0240943 A1* | 10/2005 | Smith et al. | 719/328 |
| 2006/0015843 A1* | 1/2006 | Sabbouh | 717/106 |
| 2006/0184473 A1* | 8/2006 | Eder | 706/20 |
| 2006/0230057 A1 | 10/2006 | Kosov | |
| 2007/0073771 A1 | 3/2007 | Baikov | |
| 2007/0088727 A1* | 4/2007 | Kindig | 707/101 |
| 2007/0088794 A1* | 4/2007 | Akins et al. | 709/217 |
| 2007/0089057 A1* | 4/2007 | Kindig | 715/716 |
| 2007/0150574 A1 | 6/2007 | Mallal | |
| 2007/0226262 A1 | 9/2007 | Akkiraju | |
| 2009/0049040 A1 | 2/2009 | Fay | |
| 2009/0063522 A1 | 3/2009 | Fay | |
| 2009/0100172 A1* | 4/2009 | Chen et al. | 709/224 |
| 2011/0066582 A1* | 3/2011 | Nishimura | 706/46 |
| 2011/0153292 A1* | 6/2011 | Lane et al. | 703/6 |
| 2011/0153608 A1* | 6/2011 | Lane et al. | 707/738 |
| 2011/0153610 A1* | 6/2011 | Carrato et al. | 707/738 |
| 2011/0167105 A1* | 7/2011 | Ramakrishnan et al. | 709/203 |
| 2012/0047483 A1 | 2/2012 | Amit | |
| 2012/0124546 A1 | 5/2012 | Roshen | |
| 2014/0278796 A1* | 9/2014 | Arini et al. | 705/7.33 |

* cited by examiner

WEB SERVICE ASSET MANAGEMENT AND WEB SERVICE INFORMATION STORAGE

FIELD OF THE INVENTION

The subject matter of this application relates generally to methods and apparatuses, including computer program products, for web service asset management and web service information storage.

BACKGROUND

Web service management for companies and other large enterprises can be difficult and time-consuming. Often, a company has multiple business units that use web services for certain applications or processes, and the definitions of such web services and the relationships between the web services can be complex and challenging to understand. For example, a single business application or process may rely on a number of different web services across several computing platforms, related in a multi-tiered hierarchy and defined specifically for the application.

As a result, analyzing the run-time web services environment to determine performance metrics without a current and complete understanding of the web services definitions, versions, and relationships can result in incomplete or incorrect data. In addition, if an enterprise wishes to make changes to a particular web service and/or business process that uses web services, it is imperative to be aware of how the web service(s) interrelate with other web services and what resources the web service(s) rely on in order to avoid unforeseen errors and other complications with the run-time environment.

SUMMARY OF THE INVENTION

The techniques described herein advantageously provide for a web services management system which maintains a complete understanding of the current web services run-time environment—including the definition of each web service that impacts the environment and its relationships to other web services. The techniques described herein also advantageously provide for a web services repository that stores web services definitions according to a variety of attributes and criteria to enable efficient searching for web services. Further, the techniques described herein advantageously provide for associating data fields from a particular data source to a web service interface to allow for the determination of data sources utilized by a web service—enabling improved change impact analysis and to build design specifications for development. In addition, the techniques described herein advantageously provide for monitoring a web services environment to determine the existence of unauthorized or undefined web services.

The invention, in one aspect, features a computerized method for relationship mapping, searching, and data mapping for web services. A relationship mapping is generated between a plurality of web services, where a relationship mapping module of a computing device analyzes i) consumption of web service artifacts by the plurality of web services and ii) composition of the plurality of web services, determines a relationship between two or more of the plurality of web services based on the consumption analysis and the composition analysis, the determining step including identifying an application associated with the relationship, and stores the determined relationship and associated application identification in a web services repository. A search module of the computing device locates information about a web service in the web services repository based upon a plurality of web service attributes. A data mapping module of the computing device maps a web service definition document to a data source, where the data mapping module loads the web service definition document into the web services repository, determines one or more data sources associated with the web service definition, associates a first data element of the one or more data sources with a second data element of the web service definition, and stores the association between the first data element and the second data element in the web services repository.

The invention, in another aspect, features a computerized system for relationship mapping, searching, and data mapping for web services. The system includes a computing device having a processor and being coupled to a web services repository storing information associated with a plurality of web services. The system also includes a relationship mapping module executing on the processor. The relationship mapping module is configured to generate a relationship mapping between a plurality of web services, where the relationship mapping module analyzes i) consumption of web service artifacts by the plurality of web services and ii) web service composition of the plurality of web services, determines a relationship between two or more of the plurality of web services based on the consumption analysis and the composition analysis, the determining step including identifying a business process associated with the relationship, and stores the determined relationship and associated business process in the web services repository. The system also includes a search module executing on the processor, the search module configured to locate information about a web service in the web services repository based upon a plurality of web service attributes. The system also includes a data mapping module executing on the processor. The data mapping module is configured to map a web service definition to a data source, where the data mapping module loads the web service definition into the web services repository, determines one or more data sources associated with the web service definition, associates a first data element of the one or more data sources with a second data element of the web service definition, and stores the association between the first data element and the second data element in the web services repository.

The invention, in another aspect, features a computerized method for importing web service information to and exporting web service information from a web services repository. An import module of a computing device imports a web service definition file into the web services repository. The import module links the web service definition file to a web service. An export module of the computing device exports the web service definition file from the web services repository based upon identification of the linked web service, and generates proxy web service integration code for one or more software platforms based upon the exported web service definition file.

The invention, in another aspect, features a computerized system for importing web service information to and exporting web service information from a web services repository. The system includes a computing device having a processor and being coupled to a web services repository storing information associated with a plurality of web services. The system also includes an import module executing on the processor, where the import module is configured to import a web service definition file into the web services repository and link the web service definition file to a web service. The system also includes an export module executing on the processor, where the export module is configured to export the web service definition file from the web services repository based upon identification of the linked web service and generate proxy web service integration code for one or more software platforms based upon the exported web service definition file.

The invention, in another aspect, features a computerized method for discovery and management of web services at run-time. A web service analysis module of a computing device analyzes an active web service to determine operational characteristics and determine whether the active web service is registered with a web services repository. If the active web service is not registered, a relationship mapping module of the computing device determines a relationship between the active web service and one or more other web services based upon i) consumption of web service artifacts by the active web service and ii) web service composition of the active web service, the determining step including identifying a business process associated with the relationship, and stores the determined relationship and associated business process in the web services repository. If the active web service is registered, the web service analysis module analyzes operational characteristics of the active web service, compares the operational characteristics to stored characteristics for the active web service in the web services repository, and updates the stored characteristics to match the operational characteristics.

The invention, in another aspect, features a computerized system for discovery and management of web services at run-time. The system includes a computing device having a processor and being coupled to a web services repository storing information associated with a plurality of web services. The system also includes a web service analysis module executing on the processor. The web service analysis module is configured to analyze an active web service to determine operational characteristics and determine whether the active web service is registered with a web services repository. If the active web service is registered, the web service analysis module analyzes operational characteristics of the active web service, compares the operational characteristics to stored characteristics for the active web service in the web services repository, and updates the stored characteristics to match the operational characteristics. The system also includes a relationship mapping module executing on the processor. The relationship mapping module is configured to determine, if the active web service is not registered, a relationship between the active web service and one or more other web services based upon i) consumption of web service artifacts by the active web service and ii) web service composition of the active web service, the determining step including identifying a business process associated with the relationship, and store the determined relationship and associated business process in the web services repository.

In some embodiments, any of the above aspects can include one or more of the following features. In some embodiments, the relationship between two or more of the plurality of web services is unidirectional. In some embodiments, the relationship between two or more of the plurality of web services is bidirectional. In some embodiments, the relationship between two or more of the plurality of web services indicates that a first web service consumes a second web service. In some embodiments, the relationship between two or more of the plurality of web services indicates that a first web service is consumed by a second web service. In some embodiments, the relationship between two or more of the plurality of web services indicates that a first web service is composed of a second web service and a third web service.

In some embodiments, the application is representative of a business process. In some embodiments, the plurality of web service attributes include a keyword, a deployment platform, a service owner, a data source, a status, an application name, a business process, a development project, and a release date.

In some embodiments, loading the web service definition into the web services repository includes receiving, by the data mapping module, the web service definition document and parsing, by the data mapping module, the web service definition document.

In some embodiments, linking the web service definition file to a web service includes identifying the web service to be linked based on the content of the web service definition file. In some embodiments, the identification of the linked web service is received from an input device connected to the computing device. In some embodiments, generating proxy web service integration code includes determining a set of rules associated with the one or more software platforms.

In some embodiments, the operational characteristics include a software platform on which the active web service is located. In some embodiments, the operational characteristics include a hardware platform on which the active web service is located. In some embodiments, the operational characteristics include run-time statistics associated with the active web service. In some embodiments, the operational characteristics include a process name associated with the active web service.

In some embodiments, determining a relationship between the active web service and one or more other web services includes identifying one or more web services called by the active web service. In some embodiments, determining a relationship between the active web service and one or more other web services includes identifying one or more web services that provide data to the active web service.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
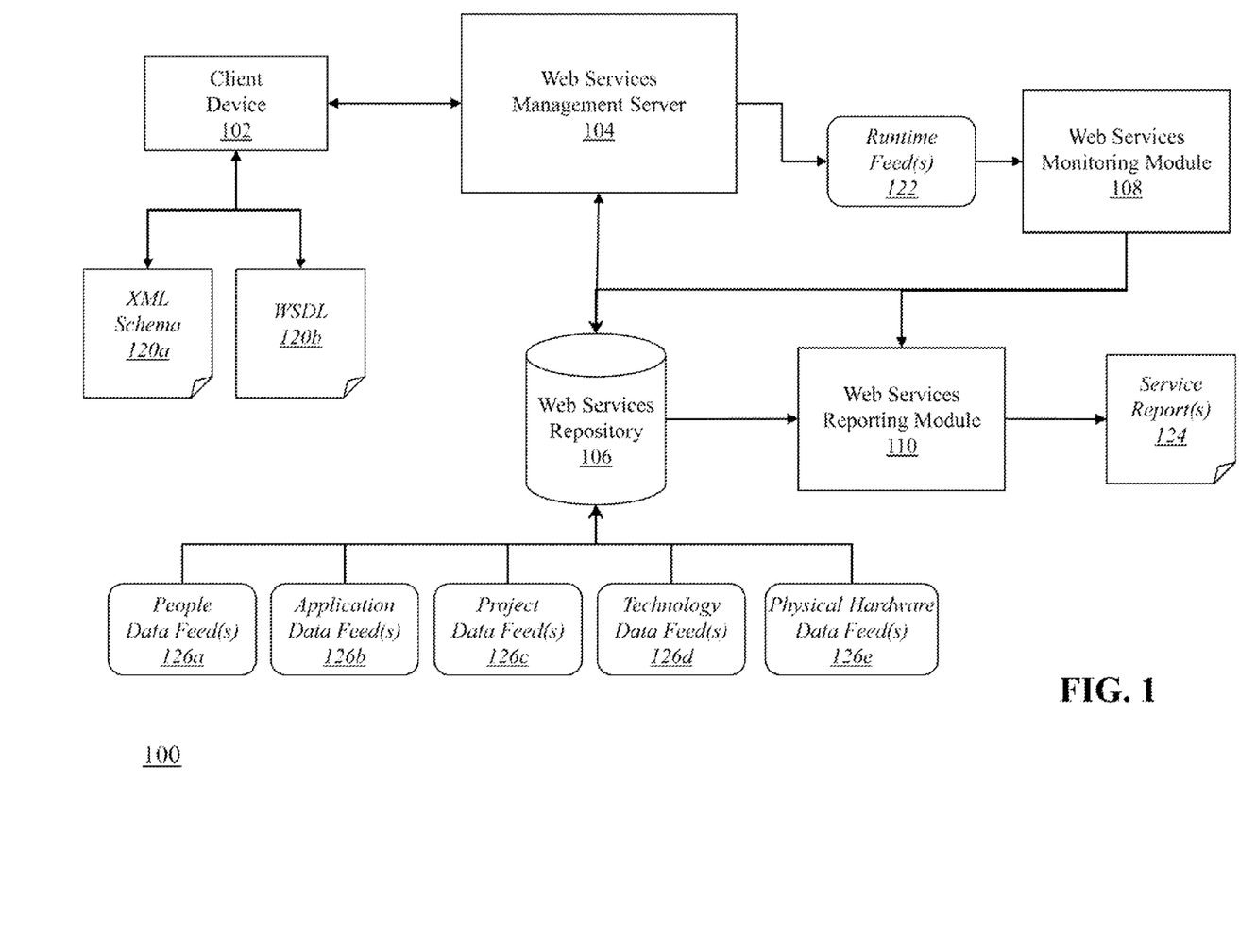
FIG. 1 is a block diagram of a system for web service asset management and web service information storage.

FIG. 1 is a block diagram of a system 100 for web service asset management and web service information storage. The system 100 includes a client computing device 102, a web services management server computing device 104, a web services repository 106, a web services monitoring module 108, and a web services reporting module 110. The computing devices implement the computer processing in accordance with computer-implemented embodiments of the invention. The methods described herein may be achieved by implementing program procedures, modules and/or software executed on, for example, a processor-based computing devices or network of computing devices.

The client computing device 102 enable a user to connect to the web services management server 104 via a communications network and access services provided by the management server 104. Exemplary client computing devices take on many forms, including but not limited to a personal computer, a tablet computer, a smart phone, an internet appliance, or the like. The client computing device 102 includes network-interface components to enable the user to connect to a communications network, such as the Internet. The computing device 102 also includes software to enable the user to navigate to an address associated with the server 104, view content received from the server 104, and provide input that is transmitted to the server 104.

The system 100 also includes a web services repository 106 coupled to the web services management server 104 (e.g., via a communications network). The web services repository 106 stores data associated with web services managed by the server 104. Other modules and computing devices in the system 100—for example, the web services management server 104, the web services monitoring module 108 and the web services reporting module 110—communicate with the web services repository 106 to retrieve data and store data associated with web services. In some embodiments, the web services repository 106 is located on a separate computing device from the web services management server 104. In some embodiments, the web services repository 106 is internally integrated into the web services management server 104. It should be appreciated that any number of computing devices, arranged in a variety of architectures, resources, and configurations (e.g., cluster computing, virtual computing, cloud computing) can be used without departing from the scope of the invention.

The web services repository 106 receives data from a variety of different data feeds associated with web services and systems that the management server 104 oversees, such as a people data feed(s) 126a, application data feed(s) 126b, project data feed(s) 126c, technology data feed(s) 126d, and physical hardware data feed(s) 126e. The data feeds 126a-126e provide information associated with the systems upon which web services operate. For example, the physical hardware data feed(s) 126e provide information (location, machine type, processor type, networking capability, and the like) associated with the computing devices used as a platform for the web services. This information is stored in the web services repository 106 and used by the other nodes 104, 108, 110 in the system 100 to determine aspects of The system 100 also includes a web services monitoring module 108. The web services monitoring module 108 is a hardware module and/or software module executing on a processor-based computing device. The web services monitoring module 108 receives run-time feed(s) 122 from the web services management server 104. The run-time feed(s) contain information associated with the execution and operation of web services being managed by the web services management server 104. For example, a run-time feed can contain detailed execution information (web service name, web service definition, resource utilization, resource dependency, transaction data and the like) for web services that the web services management server 104 controls, manages, or operates. The web services monitoring module 108 uses the information obtained via the run-time feed(s) to determine the level of activity associated with a particular web service and to determine characteristics of web services that may or may not be registered or identified by the web services management server 104 or the web services repository 106.

The system 100 also includes a web services reporting module 110. The web services reporting module 110 is a hardware module and/or software module executing on a processor-based computing device. The web services reporting module 110 retrieves web services data from the web services repository 106 and analyzes the data to determine certain operational and structural characteristics of the corresponding web services. The web services reporting module 110 generates service report(s) 124 based upon the analysis for transmission to administrators and developers that operate and use the system 100.

The communications network coupling the client device 102 to the web services management server 104 sends communications from the client computing device 102 to the server 104 and back. The network may be a local network, such as a LAN, or a wide area network, such as the Internet or the World Wide Web.

Figure 2:
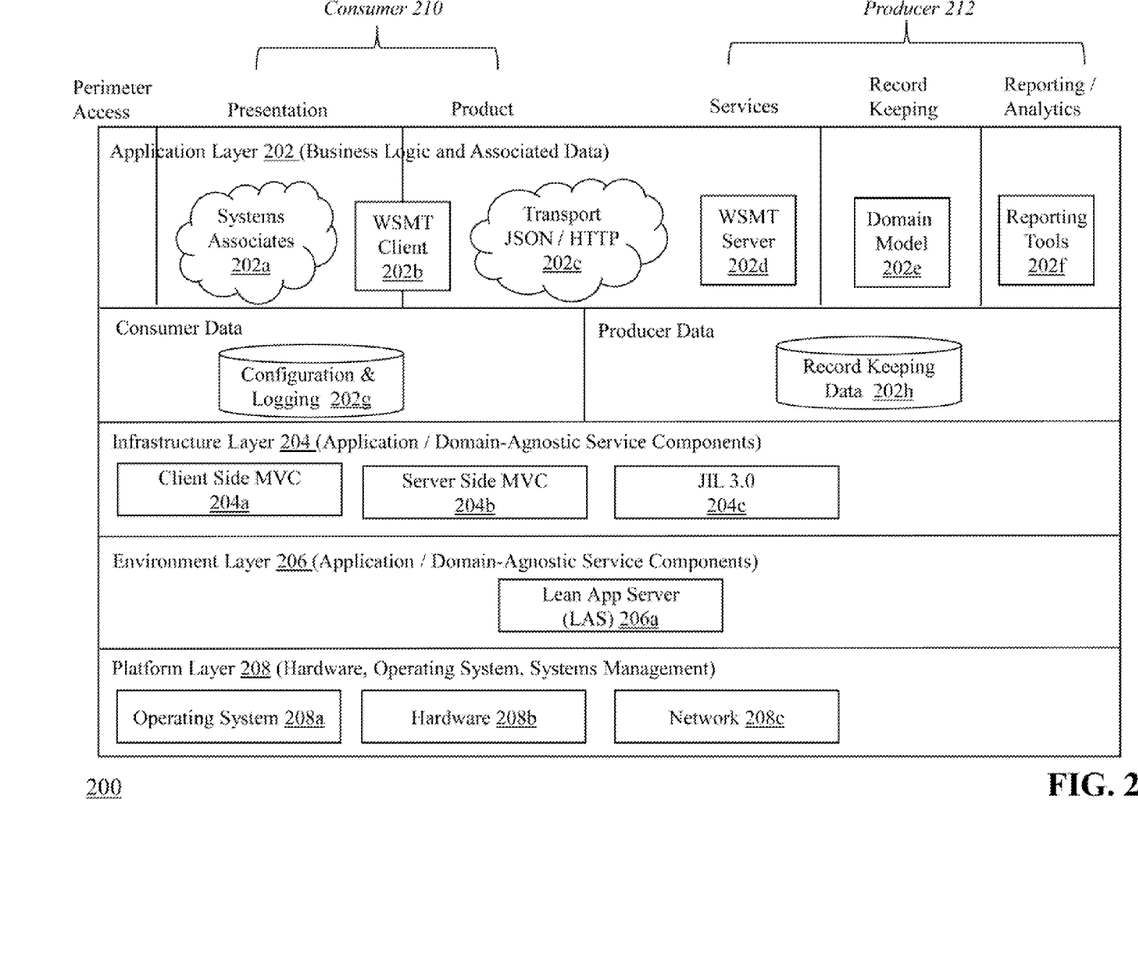
FIG. 2 is a block diagram of functional tiers of a system for web service asset management and web service information storage.

FIG. 2 is a block diagram of functional tiers 200 of a system for web service asset management and web service information storage, such as the system 100 of FIG. 1. The tiers 200 include an application layer 202, an infrastructure layer 204, an environment layer 206, and a platform layer 208. The application layer 202 contains the elements responsible for executing the business logic associated with the web service asset management and web service information storage, as well as storing and managing the associated data. The application layer 202 includes a systems/associates communication interface 202a, a web service management tool (WSMT) client 202b, a transport communication interface 202c that couples the WSMT client 202b to the WSMT server 202d, a domain model 202e, and reporting tools 202f. The application layer 202 also includes web service consumer data such as a configuration and logging data store 202g, and web service producer data 202h such as a record keeping data store 202h.

In some embodiments, the system 100 is a thin-client, web application implemented using the model-view-controller (MVC) design pattern. The system 100 has both server-side and client side components that communicate over an HTTP transport using either the HTML or JSON protocols depending on the type of request. The domain model using an ORM (Object-Relational-Mapping) framework accesses the database directly rather than through web services.

As shown in FIG. 2, the application layer 202 of the functional tiers 200 is separated into silos (e.g., consumer silos 210 and producer silos 212) that denote the spectrum of services and functionality offered by the system 100. The consumer silos 210 include presentation (e.g., user interface elements), and product (e.g., web service management modules). The producer silos 212 include services (e.g., web services management software), record keeping (e.g., data storage), and reporting/analytics. The application layer 202 also includes a perimeter access silo that relates to users logging into, authenticating to, and accessing the web service management system 100.

The systems/associates communication interface 202a enables users of the system 100, such as analysts, to access and utilize the system 100. Users of the system can connect to a Web Services Management (WSMT) client 202b, e.g., by opening a browser and navigating to an address associated with the client 202b. In other examples, the client 202b is installed on a computing device operated by the users or available to the users via a web service model. The client 202b communicates via transport connection 202c to the WSMT server 202d.

The WSMT server 202d provides the framework and resources to coordinate and manage the information relating to the web services. For example, the WSMT server 202d communicates with databases (e.g., record keeping data database 202h) to store information about the configured web services, such as rules, inputs, outputs, dependencies, relationships, deployment information, owner, versioning, and the like. The WSMT server 202d also monitors currently-executing web services to generate statistics and other performance metrics, such as consumer information, usage, reconciliation data, service status, SLA data, service identity and authorization, and the like. The server 202d also coordinates data relating to the web service environment in order to produce reports and analytics.

The domain model 202e provides definitions for the functions, objects, data, requirements, relationships and variations relating to the configured web services in the system 100. The domain model 202e incorporates both data about the web services and behavior of the web services. The domain model 202e maps the web services, as defined in the domain model paradigm, into data structures (e.g., database 202h) using an ORM (Object-Relational-Mapping) framework.

The reporting tools 202f provide the generation of reports and analytics about the configuration and execution of web services to users of the system 100. For example, the reporting tools 202f can generate ad-hoc reports about the current web services run-time environment so that administrators and other users of the system can determine stability, health, efficiency, and other attributes of the environment. The reporting tools 202f can assist a user in diagnosing a problem with a web service and also determine the impact of updates or changes to the system (e.g., by seeing how a proposed change would cascade through different web services due to relationships and dependencies). The reporting tools 202f also offer the ability to present various aspects of the web services environment visually, such as hierarchies/relationships between web services, summary and detail information about web services, web service metadata, storage requirements, and the like.

The application layer 202 also includes a data layer comprised of consumer data and producer data. The consumer data includes a configuration and logging database 202g that stores information about the configuration of web services deployed on the network (e.g., whether the service is a consumer of information/other web services, what resources the web service uses, what outputs the web service produces, and the like) and also stores logs relating to the operation and use of the web services on the network. The producer data includes a record keeping data database 202h that stores information about changes made to web services and run-time statistics and metrics associated with the current run-time environment.

The infrastructure layer 204 includes several application/domain-agnostic service components that support the application layer 202. The infrastructure layer 204 includes a client side MVC 204a, a server side MVC 204b, and a Java Intermediate Language (JIL) 3.0 module 204c. The client side MVC 204a and server side MVC 204b provide a framework for relating the user interface and associated classes/objects to the underlying data models.

The environment layer 206 contains other application/domain-agnostic service components used in support of the infrastructure layer 204 and the application layer 202. The environment layer 206 includes a Lean Application Server (LAS) 206a, such as Pivotal tc Server offered by VMware, Inc. of Palo Alto, Calif. The LAS 206a provides an agile, cost-effective and secure data and application infrastructure for the web services repository.

The platform layer 208 contains the hardware, operating system, and systems management components upon which the other layers 202, 204, 206 are built. The platform layer 208 includes the operating system 208a, hardware 208b and network 208c to operate the web services repository.

Figure 3:
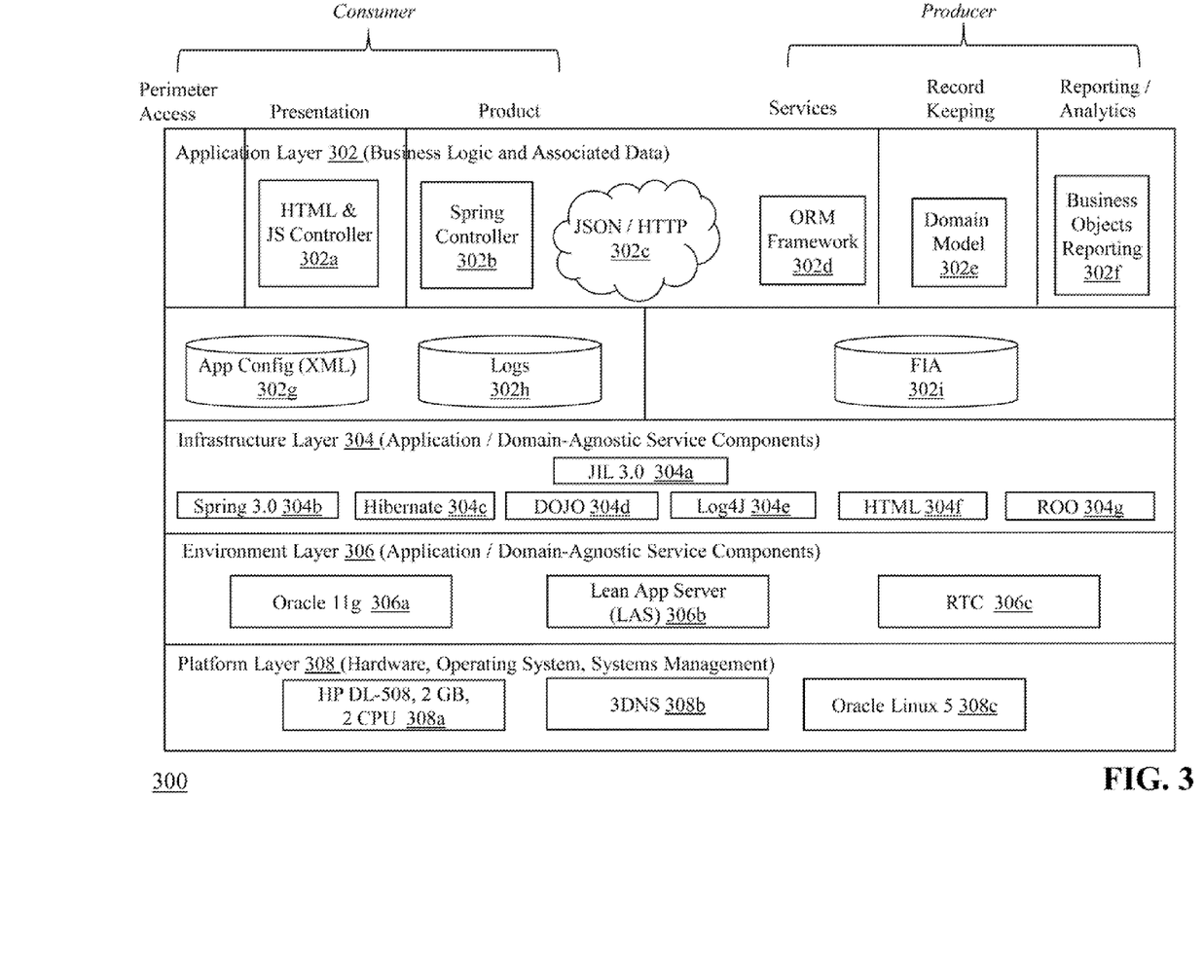
FIG. 3 is a block diagram of logical tiers of a system for web service asset management and web service information storage.

FIG. 3 is a block diagram of logical tiers of a system 300 for web service asset management and web service information storage. The system 300 in FIG. 3 corresponds to the system 200 in FIG. 2, in that it includes the same layers (e.g., application layer, infrastructure layer, environmental layer, and platform layer) and structure. It should be appreciated that the system 200 of FIG. 2 and the system 300 of FIG. 3 depict different views (i.e., functional tiers and logical tiers, respectively) of the web services system 100 of FIG. 1. It should also be appreciated that the system 300 of FIG. 3 is an exemplary embodiment of the logical tiers, and that other components and/or structure of the logical tiers can be implemented without departing from the spirit and scope of invention.

The system 300 includes an application layer 302 which, as described above, contains the elements responsible for executing the business logic associated with the web service asset management and web service information storage, as well as storing and managing the associated data. The application layer 302 includes an HTML and JavaScript Controller 302a, a Spring controller 302b, a JSON/HTTP interface 302c, an ORM framework 302d, a Domain Model module 302e and a Business Objects Reporting module 302f. The HTML and JavaScript Controller 302a and Spring Controller 302b provide client-side presentation and web services management functionality.

The Domain Model module 302e provides definitions for the functions, objects, data, requirements, relationships and variations relating to the configured web services in the system 100. The Domain Model module 302e incorporates both data about the web services and behavior of the web services. The ORM framework module 302d and Domain Model module 302e work in conjunction to map the web services, as defined in the domain model paradigm, into data structures (e.g., FIA database 302i).

The Business Objects Reporting module 302f provides the generation of reports and analytics about the configuration and execution of web services to users of the system 100. As described above with respect to the reporting tools 202f of FIG. 2, the Business Objects Reporting module 302f can generate ad-hoc reports about the current web services run-time environment so that administrators and other users of the system can determine stability, health, efficiency, and other attributes of the environment. The Business Objects Reporting module 302f can assist a user in diagnosing a problem with a web service and also determine the impact of updates or changes to the system (e.g., by seeing how a proposed change would cascade through different web services due to relationships and dependencies). The reporting tools 202f also offer the ability to present various aspects of the web services environment visually, such as hierarchies/relationships between web services, summary and detail information about web services, web service metadata, storage requirements, and the like.

The application layer 302 also includes several data stores—App Config (XML) 302g, Logs 302h, and FIA 302i—that contain information about the configuration, definition, business processes, and relationships associated with the web services, as well as information about changes made to the web services and information regarding the current web services run-time environment.

The infrastructure layer 304 contains a number of components (e.g., software tools, libraries, protocols, and other types of interworking components) that support the operation of the application layer 302, such as JIL 3.0 304a, Spring 3.0 304b, Hibernate 304c, DOJO Toolkit 304d, Log4J 304e, HTML 304f, and ROO 304g.

The environment layer 306 provides the underlying application/domain-agnostic service components used in support of the infrastructure layer 304 and the application layer 302, such as, e.g., Oracle 11g database(s) 306a, one or more lean application servers (LAS) 306b, and Rational Team Concert (RTC) 306c.

The platform layer 308 contains the hardware, operating system, and systems management components upon which the other layers 302, 304, 306 are built, such as physical computing systems/processors (e.g., HP DL-508 308a), load balancing and availability systems (e.g., 3DNS 308b) and operating systems (e.g., Oracle Linux 5 308c).

Figure 4:
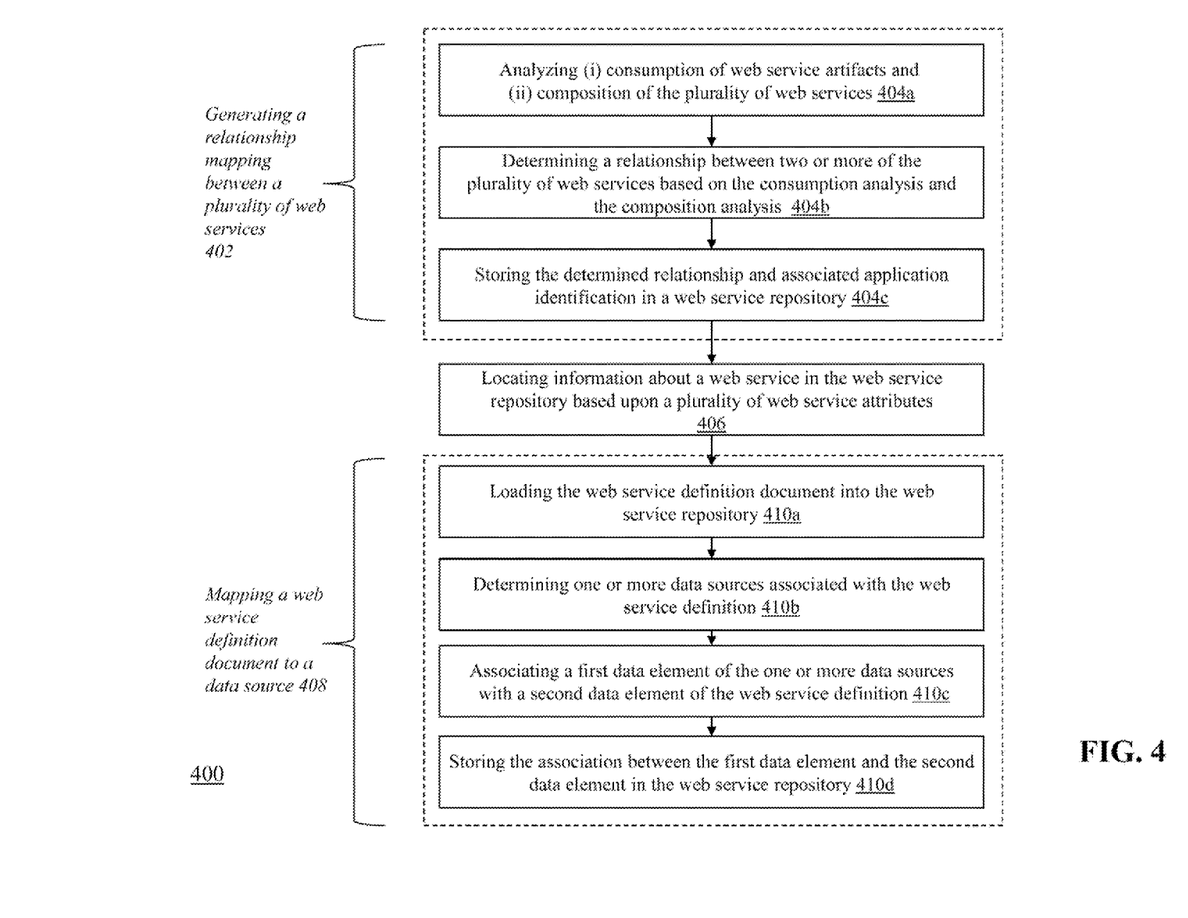
FIG. 4 is a flow diagram of a method for generating a relationship mapping between a plurality of web services and for mapping a web service definition document to data storage.

FIG. 4 is a flow diagram of a method 400 for generating a relationship mapping between a plurality of web services and for mapping a web service definition document to data storage, using the system 100 of FIG. 1. The web services management server 104 generates (402) a relationship mapping between a plurality of web services. The web services management server 104 first analyzes (404a) (i) consumption of web service artifacts and (ii) composition of the plurality of web services. Consumption of web service artifacts relates to the other web services, artifacts, and/or resources that a web service consumes (or uses) during execution or processing. For example, a web service can consume a resource or function that is offered by another web service, or by an application. Composition of the plurality of web services relates to the structure and/or hierarchy that comprises each web service as well as the inter-relationships between web services. For example, a web service can be composed of one or more other web services, in that the underlying web services provide functionality to that web service.

The web services management server 104 can determine (i) the other web services and resources that a particular web service consumes and (ii) the other web services and resources that a particular web service is composed of—and store this information in a database (e.g., web services repository 106). The information not only provides a definition of the analyzed web service but also is a starting point to understand the interconnectedness of the plurality of web services that comprise a particular application or, in some cases, the entire enterprise system.

The web services management server 104 then determines (404b) a relationship between two or more of the plurality of web services based on the consumption analysis and the composition analysis described above. The relationships between web services can be hierarchical in nature and support multiple dimensions, and can include unidirectional or bidirectional relationships. For example:

Service A can consume Service B;
Service B can be consumed by Service A;
Service A can be composed of Services B and C.

In some cases, a plurality of web services can be associated with a particular business workflow or enterprise application (e.g., financial asset trading). The web services management server 104 can determine whether a certain set of web services are associated with an application or business process based upon the relationship status determined above. For example, a first web service may be associated with a particular application, and that web service may consume several different web services, which in turn consume several more web services.

In some cases, one or more web services can be related to a particular development project (or projects) and a release date for the project. For example, the web services management server 104 determines a relationship between multiple web services that is based upon a common development project under which the web services are being developed and/or under which they will be deployed. The relationship can be associated with a specific release date (or dates) to enable web services personnel and other developers to understand a timeline for deploying the development project and associated web services in the run-time environment. The development project can also be associated with a specific business process (or processes) so that developers understand which business processes will be impacted by the web services structure that is under development. Each of these different facets of the web service relationship paradigm is managed by the server 104 and stored in the repository 106.

Once the web services management server 104 has determined the relationship structure and hierarchy of this series of web services, the server 104 can define the application as being comprised of the set of web services.

The web services management server 104 then stores (404c) the determined relationship (or relationships) and associated application identification in a web services repository (e.g., 106). The stored relationship and associated application identification is particularly useful for performing impact analysis of software or technology stack changes in an enterprise system. For example, a developer may want to change the definition of a first web service which has currently-formed relationships with and dependencies on a number of different web services. Without understanding the scope of these relationships and dependencies, the developer's change could result in problems cascading throughout the other web services. Therefore, the determined relationships and application identification that are stored in the repository 106 provide the benefit of allowing a developer to assess the impact of his or her changes on other web services and the system as a whole—both to determine the extent of work involved in implementing a change and to determine whether the change would have any unanticipated impact.

Once the relationship mapping between the web services is stored, the web services management server 104 can use the relationship mapping to locate (406) information about a particular web service in the web services repository based upon a plurality of attributes associated with the web service. In some cases, the web services management server 104 analyzes a web service and stores a definition of the web service in the repository 106. The web service definition can include attributes that define the operation of the web service, the web service interface, rules that are associated with the web service, and data that the web service receives as input and/or generates as output. In some cases, as will be described in greater detail below, a user at client device 102 can manually define a web service that operate in the run-time environment (or is in development) and/or import a definition of the web service into the server 104/repository 106.

Once a web service has been registered with the web services management server 104 and attributes of the web service are stored in the web services repository (as described above), a user at client device 102 can leverage the web service registration to search for a particular web service using, e.g., attributes such as keyword, deployment platform, implementation technology, service owner, data source, business process, relationship to other web services, service status and the like. The multi-faceted scope of web service attributes maintained by the system 100 supports multiple and/if conditions with different data points—for example, a user at client device 102 can submit a query that requests all web services in the current run-time environment that have a status equaling 'in development' that support a securities trading business process and are written in Java.

The robust web service searching techniques provided by the web services management server 104 can also use the relationship mapping for a particular web service to locate other web services that consume (or are consumed by) that web service. For example, a user at client device 102 can search the web services repository 106 for a particular web service that supports a new customer enrollment business process. Once the web service is located, the server 104 can also display a list of web services that (i) also support the new customer enrollment business process and (ii) are related to the particular web service that the user searched for. As a result, the user does not need to have a predefined understanding of the business process and/or the web services that support the business process.

Also, once a web service is defined by the server 104 and stored in the repository 106, the server 104 can also map (408) the web service definition to one or more data sources (e.g., a database) that are utilized by the web service. The web services management server 104 loads (410*a*) the web service definition document into the web services repository. As described previously, a user at client device 102 can supply a definition document or file that contains, e.g., the specification for the interface contract of a web service to the web services management server 104 for parsing and storage in the web services repository 106. For example, the definition file can be an XML schema file 120*a* or a Web Services Description Language (WSDL) file 120*b*. The web services management server 104 loads the definition file into the web services repository 106.

Next, the web services management server 104 determines (410*b*) one or more data sources associated with the web service definition. For example, as part of its execution and operation, a web service may rely on data source(s) either to receive from, or transmit data to, the data source(s). The server 104 maintains a list of current data sources utilized by the spectrum of web services currently executing in the run-time environment, as well as data sources utilized by web services in development. The server 104 can use the list of data sources as a starting point to identify and resolve a particular data source to be associated with the web service. Based upon the web service definition, the server 104 locates the data sources, as well as the particular data elements within the data source (e.g., database tables, fields) that are impacted by or utilized by the web service.

In some cases, where the server 104 does not automatically resolve a data source to be associated with the web service, a user at client device 102 can input the name of a data source, or search for a data source, to associate with the web service. In some embodiments, the user at client device 102 utilizes a graphical user interface (GUI) provided by the server 104 to search for a desired data source. Because the server 104 maintains a list of currently-used data sources, the server 104 and GUI can support such usability features such as smart typing, autocorrect, and intellisense for these known sources to assist the user in locating a data source.

Once the data source(s) to be associated with the web service definition have been determined, the web services management server 104 associates (410*c*) a first data element of the determined data sources with a second data element of the web service definition. For example, the first data element of the determined data sources can be a database field that the web service pulls information from for its operation. The second data element can be a field in the XML interface of the web service that corresponds to the database field. The web services management server 104 associates the first data element and the second data element as being connected, and stores (410*d*) the association between the first data element and the second data element in the web services repository 106.

Therefore, a user at client device 102 can retrieve a particular web service definition and quickly determine which data source(s) are related to the web service, including the specific data elements within each data source that are impacted. In some cases, the user at client device 102 can manually define the association between a first data element of the data source and a second data element of the web service interface (e.g., if the web service is in development or if the user wishes to change an association to utilize a new or different data source).

Figure 5:
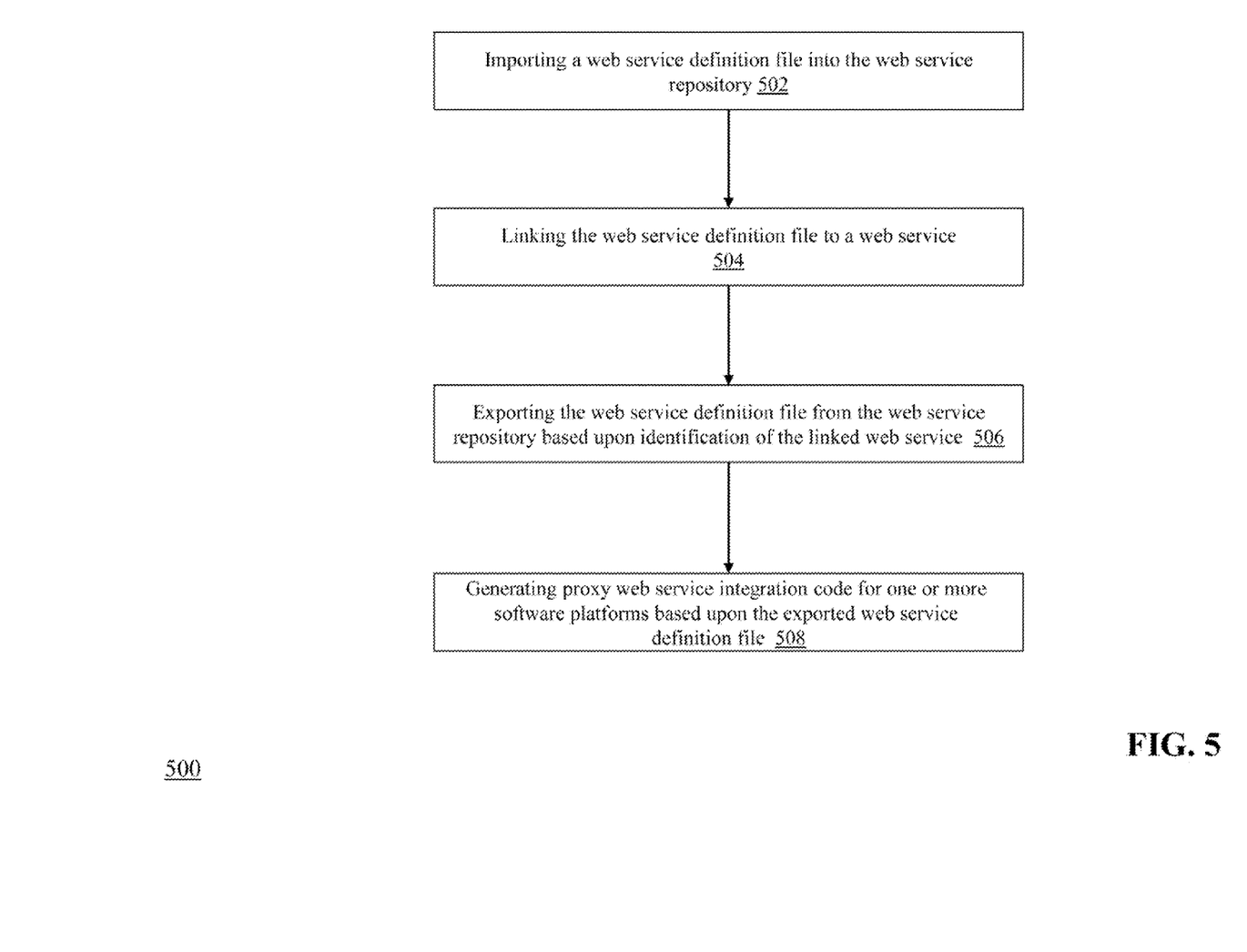
FIG. 5 is a flow diagram of a method for linking a web service definition file to a web service and for generating proxy web service integration code.

FIG. 5 is a flow diagram of a method 500 for linking a web service definition file to a web service and for generating proxy web service integration code, using the system 100 of FIG. 1. As described previously, the web services management server 104 can import (502) a web service definition file (e.g., an XML schema file 120*a* or a WSDL file 120*b*) that relates to a web service interface, into the web services repository 106. The web services management server 104 links (504) the web service definition file to a web service (either currently executing in the run-time environment or in development) that is defined and stored in the repository 106. The linking of the web service definition file to the web service in the repository 106 advantageously makes web service management and synchronization between the run-time environment and the repository more efficient and faster.

Also, in a related operation, the web services management server 104 exports (506) the web service definition file from the web services repository 106 based upon identification of the linked web service. For example, once the link between web service and web service definition file is established in the repository 106, a user at client device 102 can search the repository 106 for a particular web service and easily export the linked web service definition file (e.g., as a XML schema file 120*a* or a WSDL file 120*b*) to another application or for another use. In some cases, the exported file can be used to generate (508) proxy web service integration code for one or more software platforms (e.g., Java, .NET, Cobol). The generation of the proxy web service integration code can occur on the client device 102 and/or the web services management server 104.

The system 100 of FIG. 1 has additional capabilities relating to web service management and web service information storage. A web services monitoring module 108 is coupled to the web services management server 104 and web services repository 106. The web services monitoring module 108 receives one or more run-time feed(s) 122 from the web services management server 104 and/or repository 106 that contain information relating to the current run-time environment of the web services system 100, such as the names of web services currently executing, the resources that those web services are accessing/consuming/being consumed by, web service performance, and other similar statistics or metrics. The web services monitoring module 108 analyzes the run-time feed(s) 122 to determine the scope of web services currently running in production, as well as determine whether there are any rogue web services (i.e., services that may not be authorized to execute in the production environment, services that are not yet defined in the repository 106, or services that are exceeding a predetermined operational parameter) or any web services that are using other resources in previously-unknown ways. The web services monitoring module 108 can automatically reconcile the current run-time web services environment with data in the web services repository 106 that reflects the expected run-time environment in order to ensure that the data in the repository 106 is an accurate representation of the current run-time environment.

A web services reporting module 110 is coupled to the web services repository 106. The web services reporting module 110 retrieves web service data (e.g., run-time statistics, performance, relationships, hierarchy, web service attributes, definitions, related data sources, and the like) from the repository 106 and generates one or more service report(s) 124 based upon the retrieved data. The web services reporting module 110 can analyze and format the retrieved data according to predetermined or ad-hoc reporting requirements before generating the service reports. In some embodiments, the web services reporting module 110 performs the retrieval of data and generation of reports automatically according to a predetermined schedule or on-demand (e.g., at the request of a user of client device 102). The service reports can be transmitted to another computing device and/or to a system analyst for review. It should be appreciated that the web services reporting module 110 can be located within the web services management server as an additional feature offered by the server 104.

The web services repository 106 is coupled to a number of data feeds 126a-126e that provide the repository 106 with information regarding the web services environment and related systems. Each of the data feeds 126a-126e depicted in FIG. 1 can comprise multiple data feeds that relate to a similar classification or data type (e.g., people, application, project, technology, physical hardware). It should be appreciated that other types of data feeds can be contemplated within the scope of invention.

The repository 106 can receive information from a people data feed 126a that relates to users of the system 100, such as developers, analysts, and other personnel that manage or develop web services. The repository 106 can provide this people data to the server 104 for use in configuring access and other elements relating to the client device.

The web services repository 106 can also receive an application data feed 126b that relates to the business processes and/or applications that are defined to utilize the various web services managed by the system 100. For example, a bond trading application may be used by an entity, and the bond trading application may leverage one or more web services. Certain data elements relating to the bond trading application (e.g., name, business owner, scope, criticality, and the like) can be transmitted to the repository 106, and the web services management server 104 can utilize those data elements for assigning web services that support the application and/or presenting the application to a user at client device 102 for customization and analysis.

The web services repository 106 can also receive a project data feed 126c that relates to the development projects utilizing various web services managed by the system 100. For example, a development project can relate to enhancement or upgrading of a subset of web services for an existing application, or building web services for a new application. Certain data elements relating to the development project (e.g., name, business owner, scope, criticality, release date, developers, and the like) can be transmitted to the repository 106, and the web services management server 104 can utilize those data elements for managing the information associated with the web services in the repository 106, as well as interfacing with the client device 102 so that a user can manage and analyze the information.

The web services repository 106 can also receive a technology data feed 126d that relates to the software-based components (e.g., software platforms, operating systems, APIs, and the like) associated with web services managed by the system 100. For example, a web service may be associated with or impact a variety of different software elements running on various platforms. Certain data elements relating to the software components (e.g., name, version, relation to business application, programming language, and the like) can be transmitted to the repository 106, and the web services management server 104 can utilize those data elements for managing the information associated with the web services in the repository 106, as well as interfacing with the client device 102 so that a user can manage and analyze the information. In one example, maintaining the software component information in the web services repository 106 enables a user at client device 102 to understand the scope and effect that anticipated web service changes may have on existing software infrastructure, including potential conflicts or incompatibilities.

The web services repository 106 can also receive a physical hardware data feed 126e that relates to the hardware components (e.g., servers, network devices, database systems, and the like) associated with web services managed by the system 100. For example, a web service may be associated with or impact a variety of different hardware elements running on various platforms and in different locations. Certain data elements relating to the software components (e.g., name, location, version, availability, relation to business application, and the like) can be transmitted to the repository 106, and the web services management server 104 can utilize those data elements for managing the information associated with the web services in the repository 106, as well as interfacing with the client device 102 so that a user can manage and analyze the information. In one example, maintaining the hardware information in the web services repository 106 enables a user at client device 102 to understand the scope and effect that anticipated web service changes may have on existing hardware infrastructure, including potential conflicts or incompatibilities.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on- Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for relationship mapping, searching, and data mapping for web services, the method comprising:

a) generating a relationship mapping between a plurality of web services executed in a first computing environment comprising a plurality of computing devices, the generating comprising:

performing, by a relationship mapping module of a second computing device external to the first computing environment, a consumption analysis of the plurality of web services comprising a determination of which other web services, artifacts, or resources that each web service uses during execution;

performing, by the relationship mapping module, a composition analysis of the plurality of web services comprising a determination of a structure or hierarchy of each web service as well as the interrelationships between the web services;

determining, by the relationship mapping module, a relationship between two or more of the plurality of web services based on the consumption analysis and the composition analysis, the determining step including identifying a business process associated with the relationship; and storing, by the relationship mapping module, the determined relationship and associated business process identification in a web services repository;

b) locating, by a search module of the second computing device, metadata about a web service in the web services repository based upon a plurality of web service attributes, the web services repository including a search index applied to the metadata; and c) mapping, by a data mapping module of the second computing device, a web service definition document to a data source, the mapping comprising:

importing, by the data mapping module, the web service definition document into the web services repository;

determining, by the data mapping module, one or more data sources associated with the web service definition;

associating, by the data mapping module, a first data element of the one or more data sources with a second data element of the web service definition;

storing, by the data mapping module, the association between the first data element and the second data element in the web services repository; and exporting, by the data mapping module, the web service definition document upon request.

2. The method of claim 1, wherein the relationship between two or more of the plurality of web services is unidirectional or bidirectional.

3. The method of claim 1, wherein the relationship between two or more of the plurality of web services indicates that a first web service consumes a second web service or that a first web service is consumed by a second web service.

4. The method of claim 1, wherein the relationship between two or more of the plurality of web services indicates that a first web service is composed of a second web service and a third web service.

5. The method of claim 1, wherein the plurality of web service attributes include a keyword, a deployment platform, a service owner, a data source, a status, an application name, a business process, a development project, and a release date.

6. The method of claim 1, wherein loading the step of importing the web service definition into the web services repository comprises:

receiving, by the data mapping module, the web service definition document; and parsing, by the data mapping module, the web service definition document.

7. A computerized method for discovery and management of web services at run-time, the method comprising:

analyzing, by a web service analysis module of a second computing device, an active unregistered web service to determine a first set of operational characteristics, the active web service executing in a first computing environment comprising a plurality of computing devices;

determining, by a relationship mapping module of the second computing device, a relationship between the active web service and one or more other web services based upon i) consumption of web service artifacts by the active web service comprising a determination of which other web services, artifacts, or resources that each web service uses during execution and ii) web service composition of the active web service comprising a determination of a structure or hierarchy of each web service as well as the interrelationships between the web services, the determining step including identifying a business process associated with the relationship; and storing, by the relationship mapping module, the first set of operational characteristics, the determined relationship and associated business process in the web services repository to register the active web service;

analyzing, by the web service analysis module at a later point in time, a second set of operational characteristics of the active web service;

comparing, by the web service analysis module, the second set of operational characteristics to the stored first set of operational characteristics for the active web service in the web services repository; and updating, by the web service analysis module, the stored first set of operational characteristics based upon the second set of operational characteristics.

8. The method of claim 7, wherein the operational characteristics include a software platform and/or hardware platform on which the active web service is located.

9. The method of claim 7, wherein the operational characteristics include run-time statistics associated with the active web service.

10. The method of claim 7, wherein determining a relationship between the active web service and one or more other web services includes identifying one or more web services called by the active web service.

11. The method of claim 7, wherein determining a relationship between the active web service and one or more other web services includes identifying one or more web services that provide data to the active web service.

12. A computerized system for relationship mapping, searching, and data mapping for web services, the system comprising:

a second computing device having a processor and being coupled to a web services repository storing information associated with a plurality of web services, the web services executed in a first computing environment comprising a plurality of computing devices and the second computing device being external to the first computing environment;

a relationship mapping module executing on the processor, the relationship mapping module configured to:

generate a relationship mapping between the plurality of web services, the generating comprising:

performing a consumption analysis of the plurality of web services comprising a determination of which other web services, artifacts, or resources that each web service uses during execution;

performing a composition analysis of the plurality of web services comprising a determination of a structure or hierarchy of each web service as well as the interrelationships between the web services;

determining a relationship between two or more of the plurality of web services based on the consumption analysis and the composition analysis, the determining step including identifying a business process associated with the relationship; and storing the determined relationship and associated business process in the web services repository;

a search module executing on the processor, the search module configured to locate metadata about a web service in the web services repository based upon a plurality of web service attributes, the web services repository including a search index applied to the metadata;

a data mapping module executing on the processor, the data mapping module configured to map a web service definition to a data source, the mapping comprising:
 importing the web service definition into the web services repository;
 determining one or more data sources associated with the web service definition;
 associating a first data element of the one or more data sources with a second data element of the web service definition;
 storing the association between the first data element and the second data element in the web services repository; and
 exporting the web service definition document upon request.

13. The system of claim 12, wherein the relationship between two or more of the plurality of web services is unidirectional or bidirectional.

14. The system of claim 12, wherein the relationship between two or more of the plurality of web services indicates that a first web service consumes a second web service or that a first web service is consumed by a second web service.

15. The system of claim 12, wherein the relationship between two or more of the plurality of web services indicates that a first web service is composed of a second web service and a third web service.

16. The system of claim 12, wherein the plurality of web service attributes include a keyword, a deployment platform, a service owner, a data source, a status, an application name, a business process, a development project, and a release date.

17. The system of claim 12, wherein the step of importing the web service definition into the web services repository comprises:
 receiving the web service definition document; and
 parsing the web service definition document.

18. A computerized system for discovery and management of web services at run-time, the system comprising:
 a second computing device having a processor and being coupled to a web services repository storing information associated with a plurality of web services, the web services executed in a first computing environment comprising a plurality of computing devices and the second computing device being external to the first computing environment;
 a web service analysis module executing on the processor, the web service analysis module configured to
  analyze an active unregistered web service of the plurality of web services to determine a first set of operational characteristics;
 a relationship mapping module executing on the processor, the relationship mapping module configured to
  determine a relationship between the active web service and one or more other web services based upon i) consumption of web service artifacts by the active web service comprising a determination of which other web services, artifacts, or resources that each web service uses during execution and ii) web service composition of the active web service comprising a determination of a structure or hierarchy of each web service as well as the interrelationships between the web services, the determining step including identifying a business process associated with the relationship; and
  store the first set of operational characteristics, the determined relationship and associated business process in the web services repository to register the active web service;
 the web service analysis module further configured to
  analyze, at a later point in time, a second set of operational characteristics of the active web service;
  compare the second set of operational characteristics to the stored first set of operational characteristics for the active web service in the web services repository; and
  update the stored first set of operational characteristics based upon the second set of operational characteristics.

19. The system of claim 18, wherein the operational characteristics include a software platform and/or a hardware platform on which the active web service is located.

20. The system of claim 18, wherein the operational characteristics include run-time statistics associated with the active web service.

21. The system of claim 18, wherein determining a relationship between the active web service and one or more other web services includes identifying one or more web services called by the active web service.

22. The system of claim 18, wherein determining a relationship between the active web service and one or more other web services includes identifying one or more web services that provide data to the active web service.

* * * * *

UNITED STATES PATENT AND TRADEMARK OFFICE
CERTIFICATE OF CORRECTION

PATENT NO. : 9,026,652 B1
APPLICATION NO. : 14/327470
DATED : May 5, 2015
INVENTOR(S) : Todd Piehler et al.

Page 1 of 1

It is certified that error appears in the above-identified patent and that said Letters Patent is hereby corrected as shown below:

In Claim 6 (col. 17, line 51) delete the word "loading" after --wherein--.

Signed and Sealed this
Fifteenth Day of March, 2016

Michelle K. Lee
*Director of the United States Patent and Trademark Office*